United States Patent [19]
Gildea et al.

[11] Patent Number: 5,861,841
[45] Date of Patent: Jan. 19, 1999

[54] COMPACT GPS RECEIVER/PROCESSOR

[75] Inventors: David R. Gildea, Menlo Park; Arthur F. Lange, Sunnyvale; Charles Abraham, Cupertino, all of Calif.

[73] Assignee: Trimble Navigation Limited, Sunnyvale, Calif.

[21] Appl. No.: 917,694

[22] Filed: Aug. 26, 1997

Related U.S. Application Data

[63] Continuation of Ser. No. 678,116, Jul. 11, 1996, abandoned, which is a continuation of Ser. No. 224,125, Apr. 6, 1994, abandoned, which is a continuation-in-part of Ser. No. 978,274, Nov. 18, 1992, abandoned.

[51] Int. Cl.[6] .............................. H04B 7/185; G01S 5/02
[52] U.S. Cl. ............................................. 342/357; 701/213
[58] Field of Search ............................. 342/357; 701/213

[56] References Cited

U.S. PATENT DOCUMENTS

| | | | |
|---|---|---|---|
| 4,881,080 | 11/1989 | Jablonski ................................. | 342/357 |
| 5,101,416 | 3/1992 | Penton et al. ........................... | 342/357 |
| 5,146,231 | 9/1992 | Ghaem et al. .......................... | 342/357 |
| 5,183,404 | 2/1993 | Aldous et al. ............................ | 439/55 |
| 5,192,957 | 3/1993 | Kennedy ................................. | 342/357 |
| 5,260,875 | 11/1993 | Tofte et al. ........................ | 364/424.07 |
| 5,394,152 | 2/1995 | Pieronek et al. ......................... | 342/40 |
| 5,434,787 | 7/1995 | Okamoto et al. . | |
| 5,463,261 | 10/1995 | Skarda et al. ........................... | 307/131 |
| 5,470,233 | 11/1995 | Fruchterman et al. ................. | 434/112 |
| 5,636,122 | 6/1997 | Shah et al. . | |

*Primary Examiner*—Theodore M. Blum
*Attorney, Agent, or Firm*—William E. Pelton

[57] ABSTRACT

Apparatus for determining the present location of an observer on the Earth's surface, the apparatus including an antenna to receive Global Positioning System (GPS) signals from two or more GPS satellites and a credit card size GPS signal processing Smartcard attached to the antenna that receives the GPS signals and determines and displays the present position of the antenna. In one embodiment, the signal processing card includes a frequency downconverter to downconvert the frequency of the GPS signals received, a digital signal processor and associated memory device that is programmed to determine the present antenna location from the GPS signals received, and an information transfer device linked to a nearby host computer or other electronic device for further data processing and display. In other embodiments, the antenna, or the antenna and the downconverter, are contained on a separate card. In another embodiment, the antenna, downconverter, digital signal processor and an information transfer device are contained on a separate smart antenna card. In all these embodiments, the Smartcard device can be linked to a host computer or other electronic device to display the observer's present position on a map or to provide further processing of the GPS signals received. The card containing the information transfer device can be connected to components on a separate card by a cable or wireless link. The card interfaced with the host computer is constructed according to PCMCIA standards, with a thickness of about 3.3, 5 or 10 mm.

46 Claims, 5 Drawing Sheets

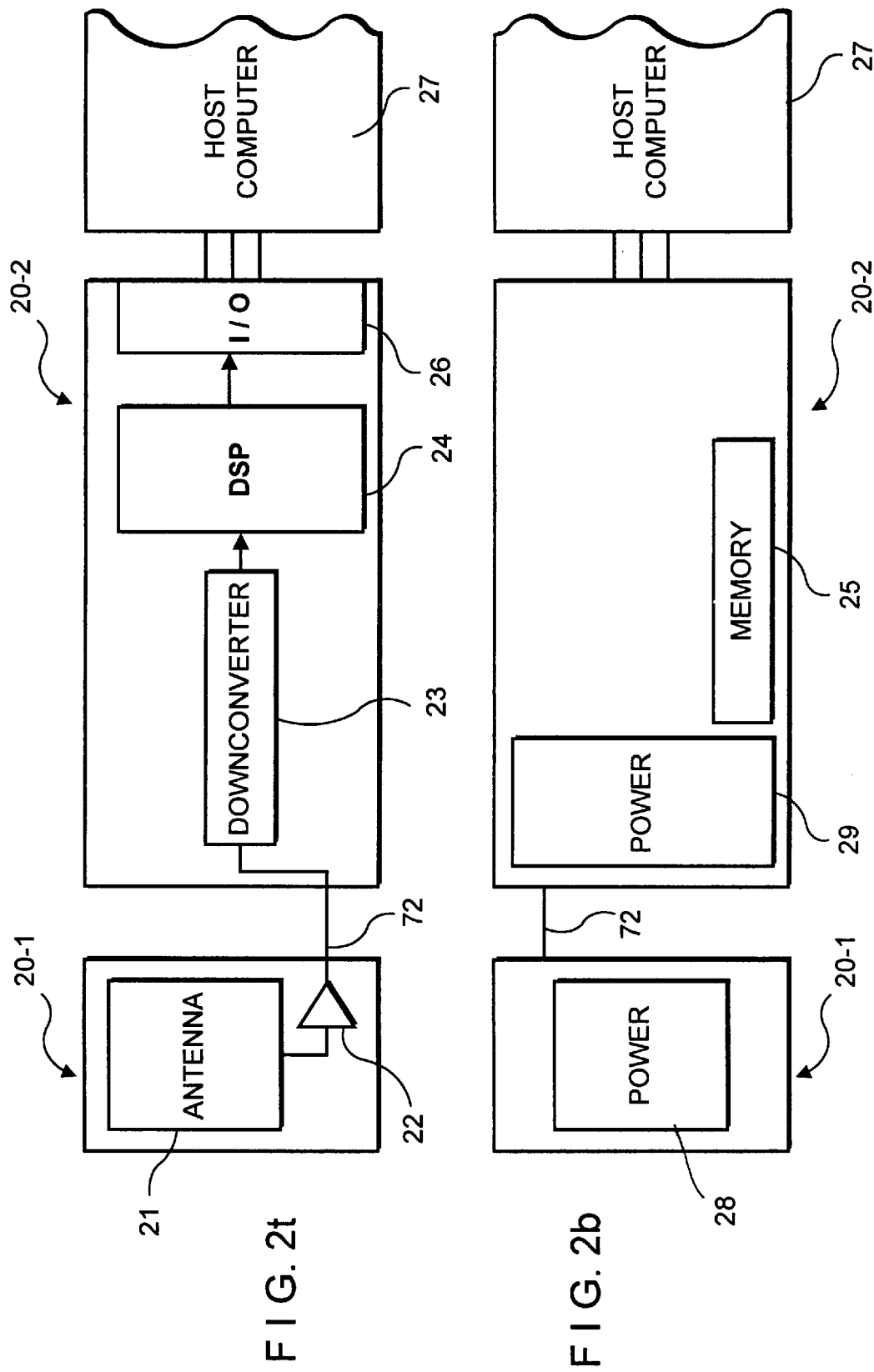

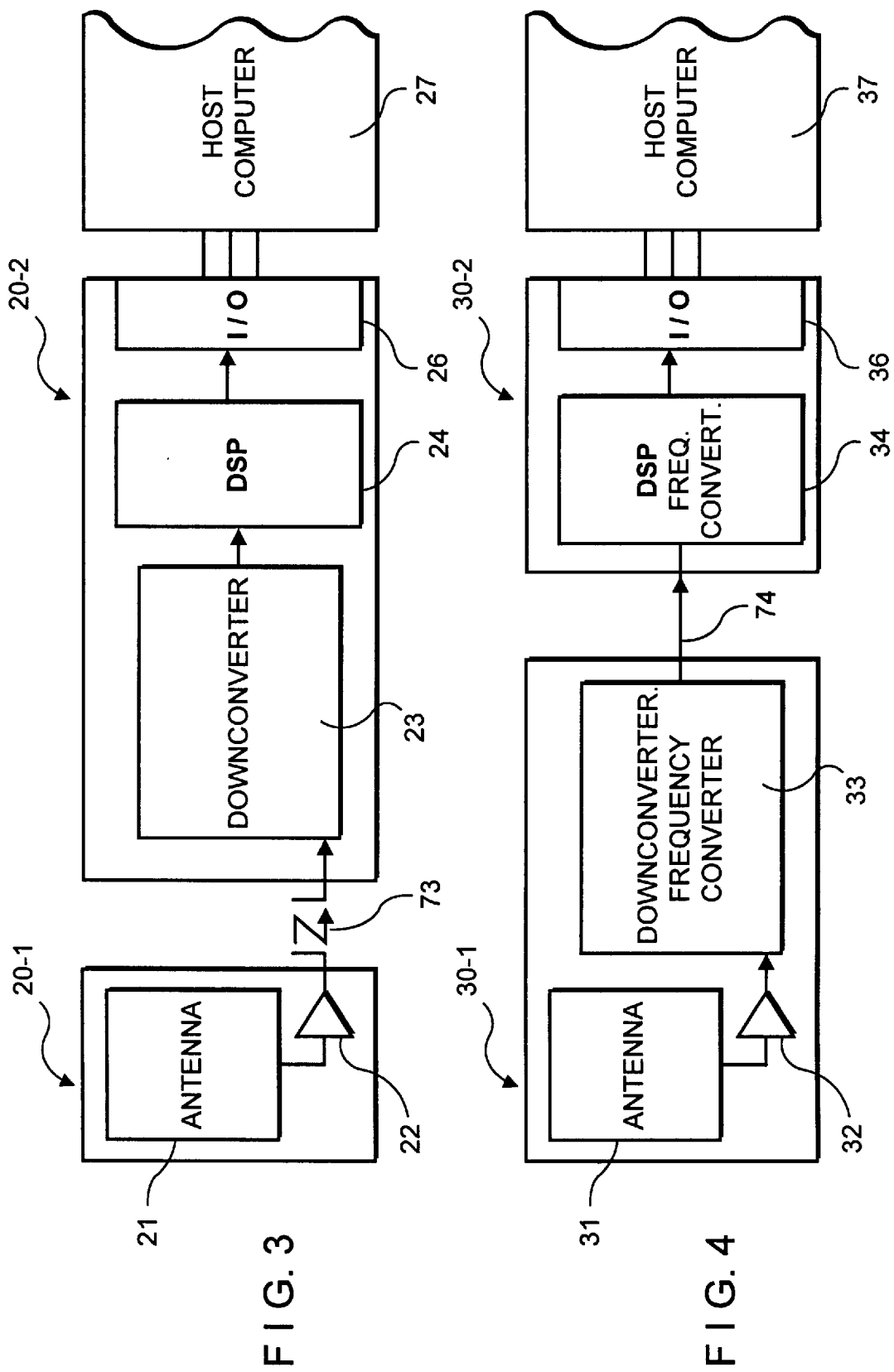

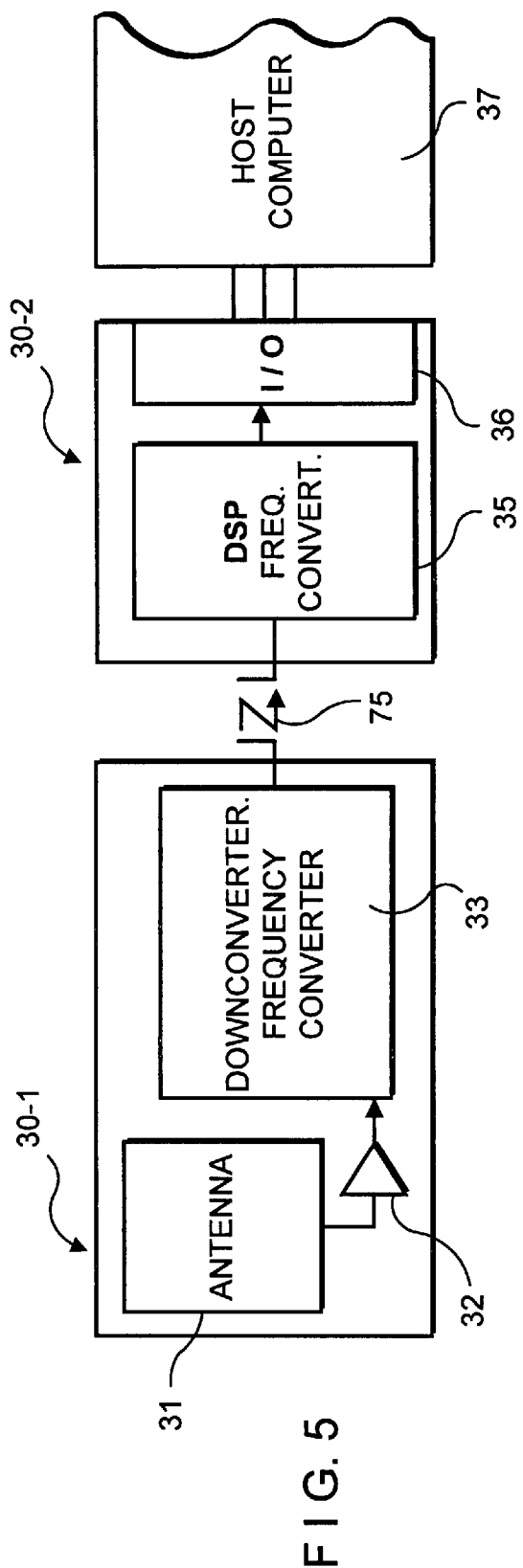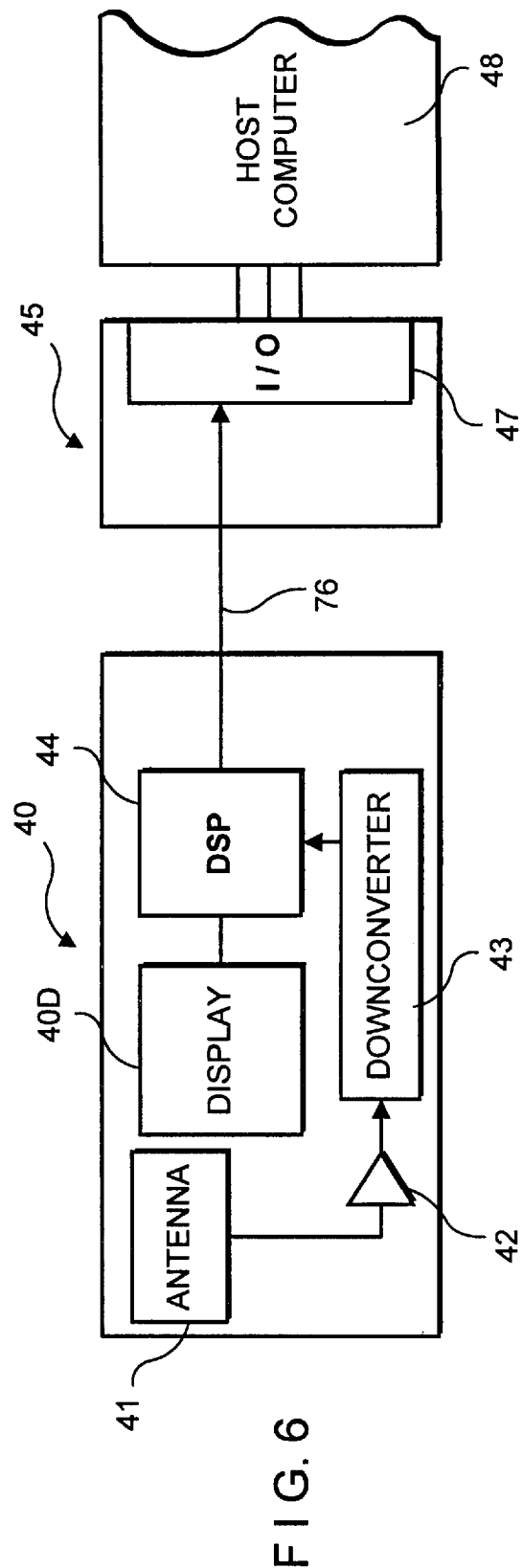

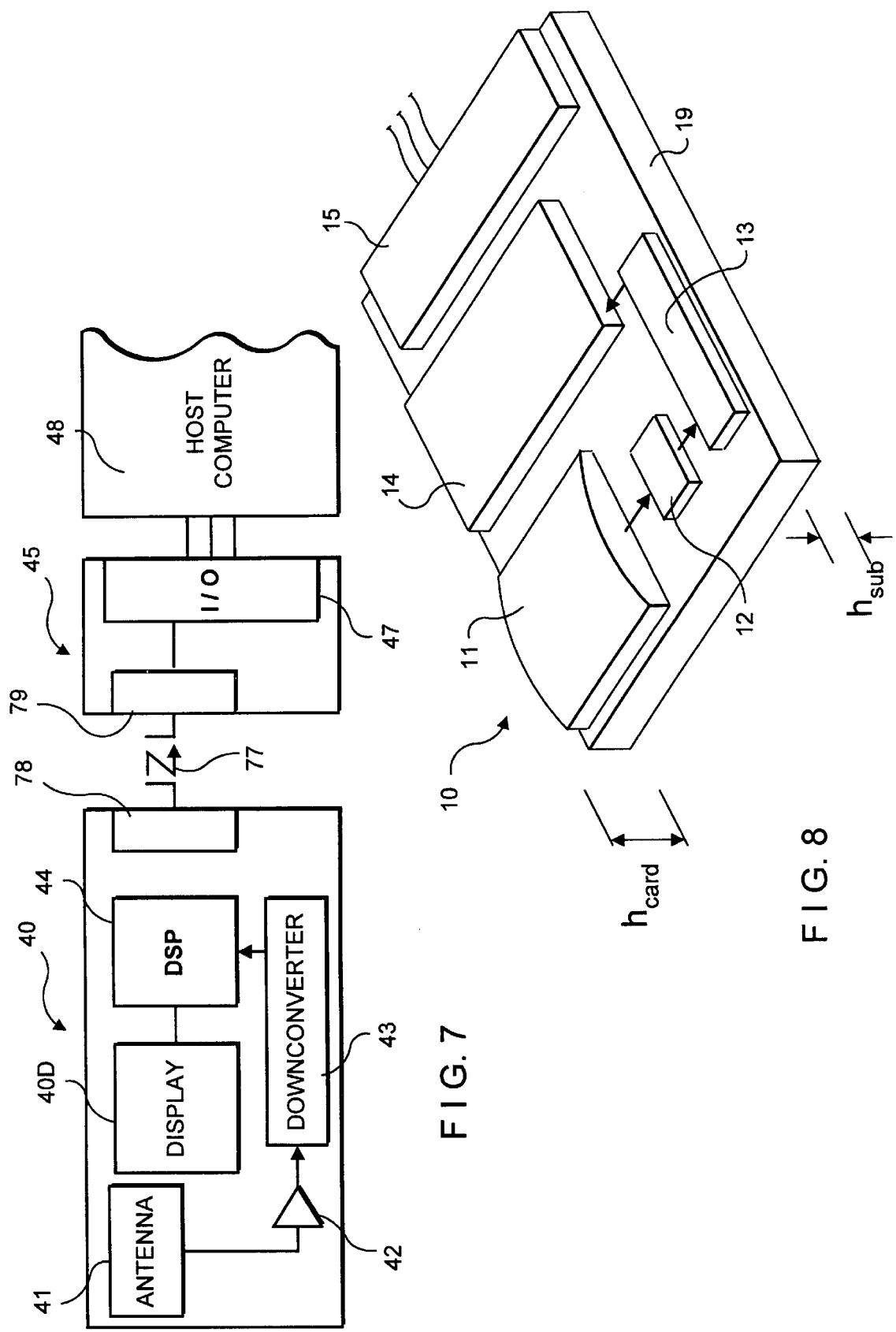

COMPACT GPS RECEIVER/PROCESSOR

This is a continuation of application Ser. No. 08/678,116 filed Jul. 11, 1996, which is a continuation of application Ser. No. 08/224,125 filed Apr. 6, 1994, which is a continuation-in-part of application Ser. No. 07/978,274 filed Nov. 18, 1992, all now abandoned.

FIELD OF THE INVENTION

Background of the Invention

Global Positioning Systems (GPSs), discussed below, are now used for many applications requiring determination of the observer's location anywhere on the Earth's surface. Current receiver/processors for GPS signals to be used in the field are small enough to be hand held but are too large to carry in an observer's pocket or other small receptacle. Development of a credit card size GPS receiver/processor is an attractive proposition, especially in view of the continuing development of "smart" credit cards that can store information therein and interact in a limited manner with a card user. Several workers have added interactive features to a credit card type information holder, for purposes such as determination of currency exchange at the present, updated exchange rate, imposition of limits on the size of a purchase by a consumer at the present exchange rate, imposition of limits on access of the cardholder to less than all areas of a site or facility, and message encoding and decoding.

Pavlov et al, in U.S. Pat. No. 4,614,861, discloses a card verification system, intended to verify the identity of the cardholder before a transaction using the card can be entered into. The card includes a keypad for on-board information entry such as personal identification number (PIN), a visual display for a transaction identification code, an optional area for mounting a photograph of the cardholder, a microprocessor and associated data and program memory, an I/O port and a power supply. The card is intended to store financial transaction data, including credit limits and card issue and expiration dates. The card is passed through a separate card reader in order to read out certain information stored on the card. This patent also contains a good discussion of background patents, as of 1984, on financial transaction information cards.

U.S. Pat. No. 4,748,320, issued to Yorimoto et al, discloses an IC card having a CPU, EEPROM data memory and program memory, RAM, and an I/O port to receive processing instructions from, and pass processed information to, a separate card reader terminal to which the card may be connected. Data memory is divided into a plurality of sectors with different functions, and an internal error detection program detects whether any particular data memory address is defective.

A foreign currency financial transaction IC card is disclosed by Boston in U.S. Pat. No. 4,766,293. The card contains a keypad for entry of the proposed foreign currency purchase and the cardholder's PIN, a plurality of special function keys indicating the nature of the transaction, a numerical display of the transaction amount in the cardholder's "own" currency, a microprocessor, ROM program memory, RAM, EEPROM data memory, and a power supply. The card indicates whether the amount of the proposed purchase or other transaction exceeds the cardholder's credit limit and verifies the correctness of the cardholder's PIN, entered at the time of each proposed transaction. This card is self-contained, with no reader interface.

Miyano, in U.S. Pat. No. 4,847,803, discloses an "IC card", containing an integrated circuit, that has a control unit for data processing, a data memory and software program memory. The IC card memory stores several personal identification numbers (PINs) and contains a program that compares an externally entered PIN index and the internally stored PINs, to determine whether the data or instructions sought to be entered by the cardholder can be accepted and executed. Data and instruction entry occurs by a conventional card reader.

A "smart" IC card, having a CPU, data memory, a "keyboard" and on-board visual display is disclosed by Tanaka in U.S. Pat. No. 4,924,075. The CPU operates in three modes, namely time display, numerical or calculational, and accounting or transactional. The keyboard includes a numerical keypad and the five numerical operations (+,−,*,/and =) and several pre-programmed transaction keys.

U.S. Pat. No. 4,965,802, issued to Shinigawa, discloses an IC card with data memory segmented into externally entered information and information generated internally from the externally entered information, including a history of transactions using the card. The card contains a data processing unit, an input/output unit, and what appears to be a read only memory (ROM) for on-board storage of fixed data processing programs. An error detection unit is optionally included on the card.

Dethloff et al disclose a smart IC card for storing and using the present currency exchange rates, in U.S. Pat. No. 4,968,873. Exchange rates for several currencies are stored and updated as required. A maximum transaction limit for the cardholder is included, which limit can be translated into the currency presently being used to determine if the transaction is permissible. The card carries a keyboard for data entry, data memory for the currency exchange rates, and a CPU to translate the currency value and compare the transaction value with the transaction limit.

Schrenk, in U.S. Pat. No. 5,014,311, discloses a smart IC card protecting secret data stored on board in a portion of data memory. Access to this portion of the data memory is limited to a predetermined time interval, with the remaining portion of data memory being accessible without restriction on time of access.

A method of downloading a software program to an IC card is disclosed in U.S. Pat. No. 5,038,025, issued to Kodera. The IC card contains program memory, data memory, a CPU, and an input/output interface that transfers program information to the card from an external keyboard user or work station. The card keeps track of available memory on board and informs the keyboard user if insufficient memory remains to accept and store a program or data. The program instructions entered from the keyboard can be stored in specified memory locations or in memory locations chosen by the CPU. Absolute addressing and/or relative addressing is available for program instruction storage.

Each of the cards discussed above is a special purpose card that interacts only with a single entry means, such as on-board keyboard or external card reader. For purposes of GPS time navigation, and position determination, GPS signals are received by an antenna or other signal input means from one or more GPS satellites, and the processed signals are provided through another signal output means for display or other purposes. What is needed is a GPS receiver/processor that is approximately "credit card size", preferably no larger that 0.5–1.0 cm. thick and with a surface area on one side of the card no greater than about 40–60 cm$^2$. The card should provide most or all of the GPS signal processing required to determine the position of the GPS receiver. The receiver/processor should allow display of its present location, in either local coordinates or in longitude, latitude and elevation coordinates. Alternatively, the receiver/processor should be linked to a nearby computer, located contiguous to or within a few hundred feet of the receiver/processor, for display of present location on a map or for additional processing of the information developed by the card's microprocessor.

SUMMARY OF THE INVENTION

These needs are met by the invention, which provides an apparatus for determining the carrier's present location on, or in the vicinity of, the earth. The apparatus includes an antenna positioned to receive Global Positioning System (GPS) signals from one or more GPS satellites, with each signal being characteristic of the particular satellite source, a downconverter to downconvert the primary frequency of these signals to a selected lower frequency, a digital signal processing (DSP) system to determine the present position and observation time for the antenna, application software for the DSP system, and an information transfer module to link data and application software to a host computer or other electronic device. All or part of this apparatus is built onto a GPS Smartcard device that is compatible with the PCMCIA standard. The GPS Smartcard device is linked to, and fits into a socket of, a host computer that receives the GPS information for further processing and/or display.

The invention has applications in creating maps of the locations of an arbitrary set of objects, stamping the time and position of events that have been witnessed, navigation, and tracking the locations and times of the carrier. The GPS Smartcard device and/or the host computer can store map databases, application software, new map objects, event marks, and/or tracks the location of the GPS Smartcard device or associated antenna.

BRIEF DESCRIPTION OF THE DRAWINGS

FIGS. 2*t* and 2*b* are schematic top and bottom views of a second embodiment of the invention.

FIG. 3 is a schematic top view of another version of the second embodiment.

FIGS. 4 and 5 are schematic top views of two versions of a third embodiment of the invention.

FIGS. 6 and 7 are schematic top views of two versions of a fourth embodiment of the invention.

FIG. 8 illustrates the first embodiment in a perspective view.

DESCRIPTION OF EMBODIMENTS OF THE INVENTION

Figures 1B, 1T:
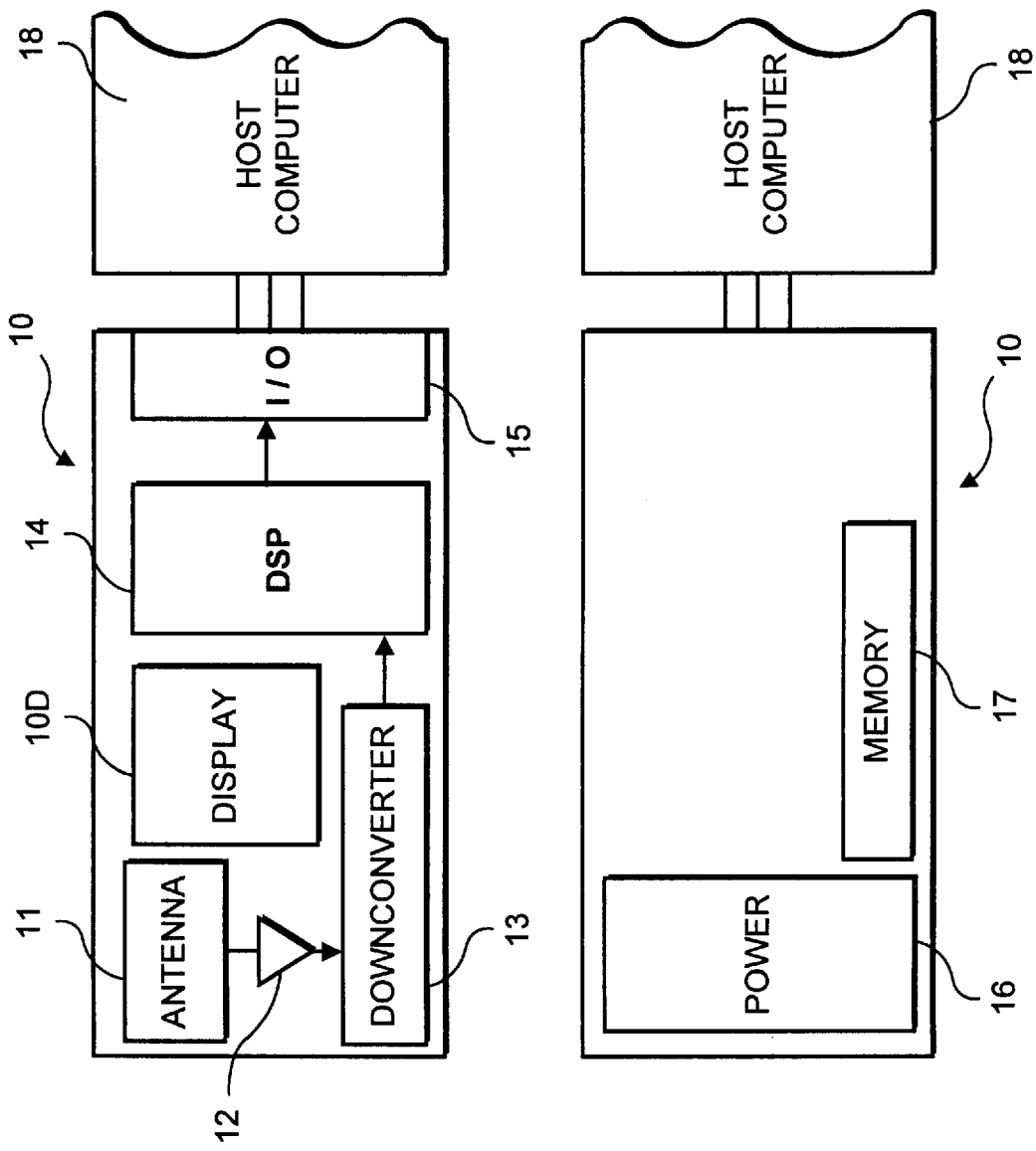
FIGS. 1*t* and 1*b* are schematic top and bottom views of a first embodiment of the invention.

Four embodiments and three variations of the invention may be implemented, depending upon which components are positioned on the portion of the apparatus that fits onto a GPS Smartcard device and upon which components are positioned adjacent to the antenna, and whether the connection between the GPS Smartcard device and the antenna is cable or wireless.

FIGS. 1*t* and 1*b* are schematic top and bottom views of a first embodiment of the invention, which includes of a credit card size receptacle and GPS processing device 10, referred to as a "GPS Smartcard device" herein for convenience. The GPS Smartcard device incorporates a GPS antenna device 11, whose antenna output signals are received by a preamplifier 12 (optional), a downconverter 13 that receives the antenna or preamplifier output signals, a digital signal processing ("DSP") system 14 and associated memory 17 that receives output signals from the downconverter, and an information transfer ("I/O") module 15 that receives output signals from the digital signal processing system and transfers such signals to an adjacent electronic device. Optionally, an on-board power source 16 to provide power is included to operate one or more of the other electronic devices on the card 10. The GPS Smartcard device 10 is attached to and electrically linked to a host computer 18 or other electronic device. The digital signal processing system or other electronic components in any embodiment may use the host computer for some or all of the computer processing and/or power and/or display required for its functions or applications. The downconverter 13 converts the high frequency GPS signal received through the GPS antenna 11 to the same GPS signal at a selected lower frequency. The memory 17 of the digital signal processing system 14 contains applications software and data needed to determine the GPS-based present location of the antenna 11 and to perform ancillary tasks for any other data processing function the GPS Smartcard device 10 may be called upon to provide. This memory may be in any form including mask ROM, EPROM, EEPROM, flash ROM, SRAM, DRAM or any combination of these or other forms. Alternatively, the GPS Smartcard device 10 may use memory resident in the host computer 16 for some or all of its functions or applications. The Smartcard device 10 may contain an optional display 10D.

FIGS. 2*t* and 2*b* are schematic top and bottom views of a second embodiment of the invention, which includes an antenna module 20-1 that contains an antenna 21, a preamplifier 22, an optional on-board power source 29. This embodiment also includes a second version of the GPS Smartcard device 20-2 that contains a downconverter 23, a digital signal processing system 24 and associated memory, an information transfer module 26 and an optional on-board power source 29. The components shown in FIGS. 2*t* and 2*b* perform substantially as do their corresponding components in FIGS. 1*t* and 1*b*. The GPS Smartcard device 20-2 is optionally attached to and electrically linked to a host computer 27. An interconnection cable 72 connects the antenna unit 20-1 and the GPS Smartcard device 20-2.

FIG. 3 is a schematic top view of a second version of the embodiment of the invention in FIGS. 2*t* and 2*b*. In this embodiment, a wireless link 73 using radiowave or infrared frequencies ($10^6$–$10^{14}$ Hz) connects the antenna module 20-1 and the GPS Smartcard device 20-2. The other components shown in FIG. 3 perform substantially as do their corresponding components of FIGS. 1*t* and 1*b*.

FIG. 4 is a schematic top view of a third embodiment of the invention, which includes an antenna module 30-1 containing an antenna 31, a preamplifier 32, a downconverter 33, and an optional on-board power source on the bottom side (not shown). This embodiment also includes a third version of the GPS Smartcard device 30-2, containing a digital signal processing system 34, an information transfer module 36 and an optional memory and optional power source on the bottom side (not shown). The components shown in FIG. 4 perform substantially as do the corresponding components in FIGS. 1*t* and 1*b*. The GPS Smartcard device 30-2 is attached to and electrically linked to a host computer 37. An interconnection cable 74 connects the antenna module 30-1 and the GPS Smartcard device 30-2.

FIG. 5 is a schematic top view of another version of the embodiment of the invention in FIG. 4. In the FIG. 5 embodiment, a wireless link 75 using radiowave or infrared frequencies connects the antenna module 30-1 and the GPS Smartcard device 34. A frequency converter that is part of the down converter 33 preferably converts the GPS frequency to a frequency that is suitable for transmission, and a frequency converter that is part of a DSP system 35 preferably converts the received frequency to a signal that is suitable for processing by the digital signal processing system 35. The other components shown in FIG. 5 perform substantially as do the corresponding components of FIGS. 1t and 1b.

FIG. 6 is a schematic top view of a fourth embodiment of the invention, which includes a GPS Smart Antenna device 40-1 containing an antenna 41, a preamplifier 42, a down-converter 43, a digital signal processing system 44, an optional memory and optional on-board power supply (bottom side) and optional display 40D. This embodiment also includes a fourth version of the GPS Smartcard device 45 containing optional memory (bottom side, not shown) for data and applications software, an information transfer module 47, and an optional power supply (bottom side). The components shown in FIG. 6 perform substantially as do the corresponding components in FIGS. 1t and 1b. The GPS Smartcard device 40-2 is attached to and electrically linked to a host computer 48. The DSP system 44 on the GPS Smart Antenna device 40-1 may use a processor in the host computer 48 for some or all of the computer processing and/or power and/or display operations required for its functions or applications. An interconnection cable 76 connects the GPS Smart Antenna device 40-1 and the GPS Smartcard device 45.

FIG. 7 is a schematic top view another version of the embodiment shown in FIG. 6. In this embodiment, a wireless link 77 using radiowave or infrared frequencies connects the Smart Antenna device 40-1 and the GPS Smartcard device 45. In the GPS Smart Antenna device 40-1, an optional transceiver 78 transmits a signal to and receives a signal from the GPS Smartcard device 45. In the GPS Smartcard device 45, an optional transceiver 79 transmits a signal to and receives a signal from the GPS Smart Antenna device 40-1. The other components shown in FIG. 7 perform substantially as do the corresponding components in FIGS. 1t and 1b.

FIG. 8 is a top perspective view of the embodiment 10 of FIGS. 1t and 1b. The GPS signal antenna 11 and other Smartcard device components may, but need not, protrude beyond the housing for the host computer 18, with the remainder of the Smartcard device 10 being contained within the housing for the computer. The thickness $h_{card}$ of the Smartcard device in any of the embodiments is approximately 3.3 mm, 5 mm or 10 mm, in accord with the PCMCIA standard, discussed below. The thickness $h_{sub}$ of the substrate 19 of the Smartcard device 10 in FIG. 8 satisfies $h_{sub} < h_{card}$. The GPS signal antenna in any of the embodiments (11 in FIG. 8) can be as small as 2 cm×2 cm in top view. Providing a Smartcard device having a thickness as small as 3.3 mm is a challenge, and providing a Smartcard device having all required components in an area no larger than about 54 mm×86 mm is a greater challenge.

In the embodiments and variations shown in FIGS. 1t, 1b, 2t, 2b, 3, 4, 5, 6 and 7, the GPS Smartcard device, the GPS Smart Antenna device or the host computer may store sufficient information to construct a map of the local region and may display the present location, in coordinate form or as a location shown on the map, of the GPS antenna device. It is preferable that any visual display of a map or other location or time information be provided on the host computer or other electronic device that is linked to the Smartcard device. However, the display may be provided on the Smartcard device or on a separate card containing the antenna. Power sources in these embodiments and variations may include rechargeable or non-rechargeable batteries.

For each of the embodiments, the GPS Smartcard device is built to be compatible with the PCMCIA standard. In a preferred embodiment, the GPS Smartcard device is built incorporating the standards of the PCMCIA card now being developed by the Personal Computer Memory Card International Association, Sunnyvale, Calif., a voluntary industrial group formed to jointly develop the standards for such cards. This group issued Release 2.0 for the PCMCIA card in September 1991, setting forth standards for the cards physical size, card interface with other microprocessor and networking devices, pin assignments, information formatting within the card, and an Execute In Place mode that allows the card to execute programs directly rather than downloading to random access memory (RAM) before executing. The Release 2.0 document is incorporated by reference herein.

The PCMCIA card provides a standard for plug-in modules to be used in a new generation of credit card size, mobile computers. By incorporating a GPS receiver/processor into a PCMCIA card, the resulting card provides the card user with substantial computing power and data and program storage on the card itself, and additional computing power and data and program storage on a host computer to which the PCMCIA card is linked. This computing power is used together with a Global Positioning System to determine the present location of a nearby antenna or other GPS signal receiving means that is linked to the PCMCIA card.

The PCMCIA card (referred to as the "Card" herein for convenience), as defined by Release 2.0, is a 2M-pin card ($M \geq 34$) that uses pin-and-socket connectors, with the pins arranged in two rows of M pins each in the preferred configuration. The Card itself operates with a memory-only interface or with an input/output interface, with the memory-only interface being the default interface. With the Card configured to operate with a memory-only interface, the pin assignments include ground (4), Vcc (2), data bits 0–15, address bits 0–25, card enable (2), output enable, write enable, card detect, card reset, programming supply voltages 1 and 2, and reserved; plus special purpose pin assignments including ready/busy, write protect, register select, battery voltage detect 1 and 2, and reserved (2). With the Card configured to operate with an input/output interface, the special purpose pins of the memory-only interface are replaced by pins for interrupt request, "IO port is 16 bit", input port acknowledge, register select & IO enable, audio digital waveform, card status changed, IO read and IO write, with all other pin assignments remaining the same. The memory-only interface version optionally provides a write protect switch on the Card. Release 2.0 provides a new option, Execute-In-Place ("XIP") that allows a computer connected to the Card to execute programs directly from instructions and/or data provided on the Card.

The Card uses either 5.0 volts or 3.3 volts for its supply voltage Vcc and provides up to 64 Mbytes of memory address space (SRAM, MaskPROM, OTPROM, EPROM, EEPROM or Flash Memory) operating with a retrieval time interval of 100, 150, 200, 250 or 600 nsec. Optionally, another 64 Mbytes of attribute memory can be provided that contains information on the Card Information Structure, Card registers configuration and additional reserved area for other uses not yet specified. The IO registers are 8N bits wide (N=1, 2, 3, . . . ). The thickness of the Card may be approximately 3.3 mm (Type I) or approximately 5 mm (Type II) or approximately 10 mm (Type III, introduced recently as a new standard). Card length and width are 85.6 mm and 54.0 mm in one version.

Operating standards for the Card include: connector contact resistance ($\leq 40$ milli-ohms), vibration and high frequency resistance, withstand voltage (500 volts rms), electrical insulation resistance (1,000 mega-ohms), current capacity (0.5 Amp/pin), temperature range for operation (–20° C. to +60° C.) and for storage (–40° C. to +70° C.), maximum relative humidity (95 percent), moisture resistance, salt water spray resistance, thermal shock resistance, cold resistance (–55° C. for 96 hours) and hydrogen sulfide resistance (38 ppm for 96 hours at temperature 40° C. and relative humidity 80 percent).

The Card offers five layers of operation standardization. The lowest layer is physical and specifies electrical and interface characteristics. The second layer, basic compatibility, specifies a minimum amount of card data organization (memory size and speed, data structures used, etc.) to be provided, optionally including the Card Information Structure. This minimum amount of card data organization can probably be satisfied with as few as 16 bits (two bytes). The third layer, data recording format, specifies how the Card data are organized (blocked versus unblocked, with or without error check sum, etc.) and is analogous to format specification for a floppy disk. The fourth layer, data organization, specifies how data are logically organized on the Card, including the operating system used (DOS, XENIX, etc.), whether the Execute-In-Place option is used, whether flash file memory is used, and application-specific information. The fifth layer specifies standards that are specific to a particular operating environment. At this time, a Card is only required to comply with the first two layers of standards. The PCMCIA standards set forth here may undergo some changes with the passage of time, as the PCMCIA concept matures.

Display of the present location coordinates, and of the results of other data processing, is optionally available on the GPS Smartcard device on a display window. Applications of such a GPS Smartcard device include the following activities: preparation of maps of a local region, including the locations of selected man-made and naturally occurring objects within the region; navigation, using a map or a sequence of related maps already downloaded into the card's software; location and time stamping for a card user, memorializing one or more events observed by the card user; and automatically tracking the location of a carrier of the card at specified times or continuously.

The digital signal processor shown in FIGS. 1$t$, 2$t$, 3, 4, 5, 6 and 7 will include software (or firmware) that receives and optionally filters the downconverted GPS signals, determines the satellite(s) from which these signals come, and processes these signals to determine, to within a few tens of meters inaccuracy, the present location of the associated GPS antenna device. This digital signal processor may also contain software for particular applications of GPS-determined location. For example, the application software may allow mapping of the locations of specified natural or man-made objects, such as utility poles and electrical transformer stations, by a cardholder working in the field. This approach would be useful if the cardholder is a repairperson assigned to report on the condition of particular man-made structures, whose locations are known in advance, after a storm, earthquake or other disruption has occurred. This approach would also be useful for augmenting an existing map by adding new features or "monuments" to the map, or for creating a new map of a region.

The GPS digital signal processor system may include a timer and appropriate software that automatically determines the location of the holder of the GPS Smartcard device and antenna at a selected sequence of times and stores the location and associated time for subsequent downloading of this information. This technique would work best with an embodiment in which the GPS signal antenna is small and can be carried as part of, or attached to, the clothing worn by the cardholder. The cardholder can do other duties.

The digital signal processor system may include software that determines, stores and displays the location of the holder of the GPS Smartcard device and antenna at a sequence of times determined volitionally by the cardholder, as an aid to navigation by the cardholder. Optionally, the digital signal processor system may also include a timer, and the software may display the local time when the cardholder's location is determined and displayed. This approach would also be useful where the cardholder requests determination and storage of time stamped locations in response to occurrence of any of a class of events, such as certain problems encountered by the cardholder working in the field.

The Global Positioning System (GPS) is part of a satellite-based navigation system developed by the United States Defense Department under its Navstar program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two L-band carrier signals: an L1 signal having a frequency f1=1575.42 MHz and an L2 signal having a frequency f2=1227.6 MHz. These two frequencies are integral multiples f1=1500 f0 and f2=1200 f0 of a base frequency f0=1.023 MHz. The L1 and L2 signals from each satellite are binary phase shift key (BPSK) modulated by predetermined pseudo random noise (PRN) codes that are different for each of the GPS satellites deployed. One motivation for use of two carrier signals L1 and L2 is to allow partial compensation for propagation delay of such a signal through the ionosphere, which delay varies approximately as the inverse square of signal frequency f (delay $f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are stored in GPS satellite signal receivers carried by ground observer's. A first PRN code for each GPS satellite, sometimes referred to as a precision code or P-code, is a relatively long, fine-grained code having an associated clock rate of 10 f0=10.23 MHz. A second PRN code for each GPS satellite, sometimes referred to as a clear/acquisition code or C/A code, is intended to facilitate rapid satellite signal acquisition and is a relatively short, coarser-grained code having a clock rate of f0=1.023 MHz. The C/A code for any GPS satellite has a length of 1023 chips or time increments before this code repeats. The P-code for any GPS satellite has length of precisely one week (7.000 days) before this code repeats. The GPS satellite bit stream includes information on the ephemeris of each GPS satellite, parameters identifying the particular GPS satellite, and corrections for ionospheric signal propagation delays. A useful discussion of the GPS and techniques for obtaining position information from the satellite signals is found in Guide To GPS Positioning, edited by David Wells, Canadian GPS Associates, 1986.

A second configuration for global positioning is the GLONASS system, placed in orbit by the former Soviet Union. GLONASS also uses 24 satellites, distributed approximately uniformly in three orbital planes of eight satellites each. Each orbital plane has a nominal inclination of 64.8 degrees relative to the equator, and the three orbital planes are separated from each other by multiples of 120 degrees longitude. The GLONASS system has circular orbits with radii of about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) MHz and f2=(1.246+7k/16) MHz, where k (=0,1,2, . . . ,23) is the channel or satellite number. Because the channel frequencies are distinguishable from each other, the P-code, and also the C/A code, is the same for each satellite. Reference to a Global Positioning System or GPS herein refers to a location determination system using GPS or GLONASS or to any other multiple-satellite-based location determination system.

We claim:

1. Apparatus for determining the present location of an observer on or near the Earth's surface and the time of observation of this location, the apparatus comprising:

a GPS Smartcard device that receives and processes GPS signals from one or more satellites, the Smartcard device comprising:

an antenna positioned to receive GPS signals from one or more GPS satellites, with each signal being characteristic of a particular satellite, and to issue these signals as antenna output signals;

a radiofrequency downconverter to receive the antenna output signals, to convert a carrier frequency of each of these signals to a selected lower frequency, and to issue these downconverted signals as downconverter output signals;

a programmed digital signal processor and associated memory that receives the downconverter output signals corresponding to each GPS signal, determines at least one of (1) the coordinates of the present location of and (2) time of observation by the antenna, and issues these signals as processor output signals; and an information transfer module that receives the digital signal processor output signals and transmits these output signals to an electronic device that is linked to, but is not a part of, the Smartcard device; and a source of power, connected to at least one of the antenna, the downconverter, the digital signal processor and the information transfer module;

wherein the Smartcard device is contained on a card that is built according to the following standards:

the Smartcard contains at least 68 pin-and-socket electrical connections, with these connections being arranged in at least two rows;

a portion of the Smartcard can be inserted into a computer to execute computer programs directly from instructions and data provided from at least one of the Smartcard and the computer;

the Smartcard has at least two bytes of memory for card organization purposes;

the Smartcard has an approximate thickness drawn from the class of electronic card thicknesses consisting of 3.3 mm, 5 mm and 10 mm;

the portion of the Smartcard that can be inserted into a computer has a length of about 85 mm and a width of about 54 mm;

the Smartcard has an input/output digital signal register for receiving input signals and for issuing output signals, and the width of the register allows receipt and issuance of signals having signal widths of 8M bits with $M \geq 1$; and the Smartcard operates in at least one of two configurations, a memory-only configuration in which the card serves primarily as a memory interface for a microprocessor that is not on the card, and an input/output configuration in which the card receives signals from and issues signals to a microprocessor that is not on the card, and in each of these configurations the card provides at least 8 data bit input/output connections.

2. The apparatus of claim 1, wherein said electronic device linked to said Smartcard device is a computer, and at least one of the computer and said digital signal processor contains data required to construct a map of at least one local region of the Earth.

3. The apparatus of claim 2, wherein at least one of said computer and said digital signal processor allows a user of said Smartcard device to perform at least one of the following operations: adding features on said map, deleting features on said map, and moving features on said map.

4. The apparatus of claim 1, wherein said electronic device linked to said Smartcard device is a computer, and at least one of said information transfer module and the computer includes a socket that allows said Smartcard device and the computer to attach to and electronically communicate with each other.

5. The apparatus of claim 1, wherein said electronic device linked to said Smartcard device is a computer that displays at least one of a GPS-determined location coordinate of said antenna and said GPS-determined time of observation by said antenna.

6. The apparatus of claim 1, wherein said electronic device linked to said Smartcard device is a computer that displays said present location of said antenna on a map.

7. The apparatus of claim 1, wherein said electronic device linked to said Smartcard device is a computer that receives and stores at least two locations of the user, and the times of observation of these locations, from said Smartcard device and performs performs at least one of two operations: storing a track of movements of a user of said Smartcard device and displaying a track of movements of a user of said Smartcard device.

8. The apparatus of claim 1, wherein said electronic device linked to said Smartcard device is a computer that allows a user of said Smartcard device to determine and store the location coordinates of at least one event observed by the user and the time of observation of this event.

9. The apparatus of claim 1, wherein said Smartcard device in said memory-only configuration provides at least one of the following electrical connections: a connection indicating that the card is ready/busy, a write protect connection, a register select connection, and a voltage supply detect connection for at least one programming supply voltage connection; and said Smartcard device in said memory-only configuration provides at least one of the following electrical connections: a card enable connection, a card output enable connection, a card write enable connection, a card detect connection, a card reset connection, and a programming supply voltage connection.

10. The apparatus of claim 1, wherein said Smartcard device in said input/output configuration provides at least one of the following electrical connections: interrupt request connection, a connection indicating that the data passing through said input/output connections has 16 bits, a connection allowing register selection, a connection allowing enablement of said data input/output connections, a connection allowing receipt or issuance of an audio digital waveform, a connection indicating that the status of said card has changed, a connection allowing read enablement of said data input/output connections, and a connection allowing write enablement of said data input/output connections; and said Smartcard device in said input/output configuration provides at least one of the following electrical connections: a card enable connection, a card output enable connection, a card write enable connection, a card detect connection, a card reset connection, and a programming supply voltage connection.

11. Apparatus for determining the present location of an observer on or near the Earth's surface and the time of observation of this location, the apparatus comprising:

an antenna positioned to receive GPS signals from one or more GPS satellites, with each signal being characteristic of a particular satellite, and to issue these signals as antenna output signals;

a GPS Smartcard device that receives and processes the antenna output signals, the Smartcard device comprising:

a radiofrequency downconverter to receive the antenna output signals, to convert a carrier frequency of each of these signals to a selected lower frequency, and to issue these downconverted signals as downconverter output signals;

a programmed digital signal processor and associated memory that receives the downconverter output signals corresponding to each GPS signal, determines at least one of (1) the coordinates of the present location of and (2) time of observation by the antenna, and issues these signals as processor output signals; and an information transfer module that receives the digital signal processor output signals and transmits these output signals to an electronic device that is linked to the Smartcard device; and a source of power, connected to at least one of the antenna, the downconverter, the digital signal processor and the information transfer module;

wherein the Smartcard device is contained on a card that is built according to the following standards:

the Smartcard contains at least 68 pin-and-socket electrical connections, with these connections being arranged in at least two rows;

a portion of the Smartcard can be inserted into a computer to execute computer programs directly from instructions and data provided from at least one of the Smartcard and the computer;

the Smartcard has at least two bytes of memory for card organization purposes;

the Smartcard has an approximate thickness drawn from the class of electronic card thicknesses consisting of 3.3 mm, 5 mm and 10 mm;

the portion of the Smartcard that can be inserted into a computer has a length of about 85 mm and a width of about 54 mm;

the Smartcard has an input/output digital signal register for receiving input signals and for issuing output signals, and the width of the register allows receipt and issuance of signals having signal widths of 8M bits with $M \geq 1$; and the Smartcard operates in at least one of two configurations, a memory-only configuration in which the card serves primarily as a memory interface for a microprocessor that is not on the card, and an input/output configuration in which the card receives signals from and issues signals to a microprocessor that is not on the card, and in each of these configurations the card provides at least 8 data bit input/output connections.

12. The apparatus of claim 11, wherein said electronic device linked to said Smartcard device is a computer, and at least one of the computer and said digital signal processor contains data required to construct a map of at least one local region of the Earth.

13. The apparatus of claim 12, wherein at least one of said computer and said digital signal processor allows a user of said Smartcard to perform at least one of the following operations: adding features on said map, deleting features on said map, and moving features on said map.

14. The apparatus of claim 11, wherein said electronic device linked to said Smartcard device is a computer, and at least one of said information transfer module and the computer includes a socket that allows said Smartcard device and the computer to attach to and electronically communicate with each other.

15. The apparatus of claim 11, wherein said electronic device linked to said Smartcard device is a computer that displays at least one of a GPS-determined location coordinate of said antenna and said GPS-determined time of observation by said antenna.

16. The apparatus of claim 11, wherein said electronic device linked to said Smartcard device is a computer that displays said present location of said antenna on a map.

17. The apparatus of claim 11, wherein said electronic device linked to said Smartcard device is a computer that receives and stores at least two locations of the user, and the times of observation of these locations, from said Smartcard device and performs performs at least one of two operations: storing a track of movements of a user of said Smartcard device and displaying a track of movements of a user of said Smartcard device.

18. The apparatus of claim 11, wherein said electronic device linked to said Smartcard device is a computer that allows a user of said Smartcard device to determine and store the location coordinates of at least one event observed by the user and the time of observation of this event.

19. The apparatus of claim 11, wherein said antenna is connected to said Smartcard device by a cable.

20. The apparatus of claim 11, wherein said antenna is connected to said Smartcard device by a wireless link operating at radiowave or infrared frequencies.

21. The apparatus of claim 11, wherein said Smartcard device in said memory-only configuration provides at least one of the following electrical connections: a connection indicating that the card is ready/busy, a write protect connection, a register select connection, and a voltage supply detect connection for at least one programming supply voltage connection; and said Smartcard device in said memory-only configuration provides at least one of the following electrical connections: a card enable connection, a card output enable connection, a card write enable connection, a card detect connection, a card reset connection, and a programming supply voltage connection.

22. The apparatus of claim 11, wherein said Smartcard device in said input/output configuration provides at least one of the following electrical connections: interrupt request connection, a connection indicating that the data passing through said input/output connections has 16 bits, a connection allowing register selection, a connection allowing enablement of said data input/output connections, a connection allowing receipt or issuance of an audio digital waveform, a connection indicating that the status of said card has changed, a connection allowing read enablement of said data input/output connections, and a connection allowing write enablement of said data input/output connections; and said Smartcard device in said input/output configuration provides at least one of the following electrical connections: a card enable connection, a card output enable connection, a card write enable connection, a card detect connection, a card reset connection, and a programming supply voltage connection.

23. Apparatus for determining the present location of an observer on or near the Earth's surface and the time of observation of this location, the apparatus comprising:

a downconverter module positioned to receive and process GPS signals from one or more GPS satellites, with each signal being characteristic of a particular satellite, the downconverter module comprising:

an antenna positioned to receive GPS signals from one or more GPS satellites, with each signal being characteristic of a particular satellite, and to issue these signals as antenna output signals; and a radiofrequency downconverter to receive the antenna output signals, to convert a carrier frequency of each of these signals to a selected lower frequency, and to issue these downconverted signals as downconverter output signals;

a GPS Smartcard device that receives and processes the antenna output signals, the Smartcard device comprising:

a programmed digital signal processor and associated memory that receives the downconverter output signals corresponding to each GPS signal, determines at least one of (1) the coordinates of the present location of and (2) time of observation by the antenna, and issues these signals as processor output signals; and an information transfer module that receives the digital signal processor output signals and transmits these output signals to an electronic device that is linked to the Smartcard device; and a source of power, connected to at least one of the antenna, the downconverter, the digital signal processor and the information transfer module;

wherein the Smartcard device is contained on a card that is built according to the following standards:

the Smartcard contains at least 68 pin-and-socket electrical connections, with these connections being arranged in at least two rows;

a portion of the Smartcard can be inserted into a computer to execute computer programs directly from instructions and data provided from at least one of the Smartcard and the computer;

the Smartcard has at least two bytes of memory for card organization purposes;

the Smartcard has an approximate thickness drawn from the class of electronic card thicknesses consisting of 3.3 mm, 5 mm and 10 mm;

the portion of the Smartcard that can be inserted into a computer has a length of about 85 mm and a width of about 54 mm;

the Smartcard has an input/output digital signal register for receiving input signals and for issuing output signals, and the width of the register allows receipt and issuance of signals having signal widths of 8M bits with $M \geq 1$; and the Smartcard operates in at least one of two configurations, a memory-only configuration in which the card serves primarily as a memory interface for a microprocessor that is not on the card, and an input/output configuration in which the card receives signals from and issues signals to a microprocessor that is not on the card, and in each of these configurations the card provides at least 8 data bit input/output connections.

24. The apparatus of claim 23, wherein said electronic device linked to said Smartcard device is a computer, and at least one of the computer and said digital signal processor contains data required to construct a map of at least one local region of the Earth.

25. The apparatus of claim 24, wherein at least one of said computer and said digital signal processor allows a user of said Smartcard device to perform at least one of the following operations: adding features on said map, deleting features on said map, and moving features on said map.

26. The apparatus of claim 23, wherein said electronic device linked to said Smartcard device is a computer, and at least one of said information transfer module and the computer includes a socket that allows said Smartcard device and said computer to attach to and electronically communicate with each other.

27. The apparatus of claim 23, wherein said computer displays at least one of a GPS-determined location coordinates of said antenna and said GPS-determined time of observation by said antenna.

28. The apparatus of claim 23, wherein said electronic device linked to said Smartcard device is a computer that displays the present location of said antenna on a map.

29. The apparatus of claim 23, wherein said electronic device linked to said Smartcard device is a computer that receives and stores at least two locations of the user, and the times of observation of these locations, from said Smartcard device and performs performs at least one of two operations: storing a track of movements of a user of said Smartcard device and displaying a track of movements of a user of said Smartcard device.

30. The apparatus of claim 23, wherein said electronic device linked to said Smartcard device is a computer that allows a user of said Smartcard device to determine and store the location coordinates of at least one event observed by the user and the time of observation of this event.

31. The apparatus of claim 23, wherein said downconverter module is connected to said Smartcard device by a cable.

32. The apparatus of claim 23, wherein said downconverter module is connected to said Smartcard device by a wireless link operating at radiowave or infrared frequencies.

33. The apparatus of claim 23, wherein said Smartcard in said memory-only configuration provides at least one of the following electrical connections: a connection indicating that the card is ready/busy, a write protect connection, a register select connection, and a voltage supply detect connection for at least one programming supply voltage connection; and said Smartcard in said memory-only configuration provides at least one of the following electrical connections: a card enable connection, a card output enable connection, a card write enable connection, a card detect connection, a card reset connection, and a programming supply voltage connection.

34. The apparatus of claim 23, wherein said Smartcard in said input/output configuration provides at least one of the following electrical connections: interrupt request connection, a connection indicating that the data passing through said input/output connections has 16 bits, a connection allowing register selection, a connection allowing enablement of said data input/output connections, a connection allowing receipt or issuance of an audio digital waveform, a connection indicating that the status of said card has changed, a connection allowing read enablement of said data input/output connections, and a connection allowing write enablement of said data input/output connections; and said Smartcard in said input/output configuration provides at least one of the following electrical connections: a card enable connection, a card output enable connection, a card write enable connection, a card detect connection, a card reset connection, and a programming supply voltage connection.

35. Apparatus for determining the present location of an observer on or near the Earth's surface and the time of observation of this location, the apparatus comprising:

a GPS Smart Antenna device, positioned to receive and process GPS signals and comprising:

an antenna positioned to receive GPS signals from one or more GPS satellites, with each signal being characteristic of a particular satellite, and to issue these signals as antenna output signals;

a radiofrequency downconverter to receive the antenna output signals, to convert a carrier frequency of each of these signals to a selected lower frequency, and to issue these downconverted signals as downconverter output signals; and a programmed digital signal processor and associated memory that receives the downconverter output signals corresponding to each GPS signal, determines at least one of (1) the coordinates of the present location of and (2) time of observation by the antenna, and issues these signals as processor output signals;

a GPS Smartcard device that receives and processes GPS signals from the Smart Antenna device, the Smartcard device comprising:

an information transfer module that receives the digital signal processor output signals and transmits these output signals to an electronic device that is linked to the Smartcard device; and a source of power, connected to at least one of the antenna, the downconverter, the digital signal processor and the information transfer module;

wherein the Smartcard device is contained on a card that is built according to the following standards:

the Smartcard contains at least 68 pin-and-socket electrical connections, with these connections being arranged in at least two rows;

a portion of the Smartcard can be inserted into a computer to execute computer programs directly from instructions and data provided from at least one of the Smartcard and the computer;

the Smartcard has at least two bytes of memory for card organization purposes;

the Smartcard has an approximate thickness drawn from the class of electronic card thicknesses consisting of 3.3 mm, 5 mm and 10 mm;

the portion of the Smartcard that can be inserted into a computer has a length of about 85 mm and a width of about 54 mm;

the Smartcard has an input/output digital signal register for receiving input signals and for issuing output signals, and the width of the register allows receipt and issuance of signals having signal widths of 8M bits with $M \geq 1$; and the Smartcard operates in at least one of two configurations, a memory-only configuration in which the card serves primarily as a memory interface for a microprocessor that is not on the card, and an input/output configuration in which the card receives signals from and issues signals to a microprocessor that is not on the card, and in each of these configurations the card provides at least 8 data bit input/output connections.

36. The apparatus of claim 35, wherein said electronic device linked to said Smartcard device is a computer, and at least one of the computer and said digital signal processor contains data required to construct a map of at least one local region of the Earth.

37. The apparatus of claim 36, wherein at least one of said computer and said digital signal processor allows a user of said Smartcard to perform at least one of the following operations: adding features on said map, deleting features on said map, and moving features on said map.

38. The apparatus of claim 35, wherein said electronic device linked to said Smartcard device is a computer, and at least one of said information transfer module and the computer includes a socket that allows said Smartcard device and the computer to attach to and electronically communicate with each other.

39. The apparatus of claim 35, wherein said electronic device linked to said Smartcard device is a computer that displays at least one of a GPS-determined location coordinate of said antenna and said GPS-determined time of observation by said antenna.

40. The apparatus of claim 35, wherein said electronic device linked to said Smartcard device is a computer that displays the present location of said antenna on a map.

41. The apparatus of claim 35, wherein said electronic device linked to said Smartcard device is a computer that receives and stores at least two locations of the user, and the times of observation of these locations, from said Smartcard device and performs performs at least one of two operations: storing a track of movements of a user of said Smartcard device and displaying a track of movements of a user of said Smartcard device.

42. The apparatus of claim 35, wherein said electronic device linked to said Smartcard device is a computer that allows a user of said Smartcard device to determine and store the location coordinates of at least one event observed by the user and the time of observation of this event.

43. The apparatus of claim 35, wherein said Smart Antenna device is connected to said Smartcard device by a cable.

44. The apparatus of claim 35, wherein said Smart Antenna device is connected to said Smartcard device by a wireless link that operates at radiowave or infrared frequencies.

45. The apparatus of claim 35, wherein said Smartcard device in said memory-only configuration provides at least one of the following electrical connections: a connection indicating that the card is ready/busy, a write protect connection, a register select connection, and a voltage supply detect connection for at least one programming supply voltage connection; and said Smartcard device in said memory-only configuration provides at least one of the following electrical connections: a card enable connection, a card output enable connection, a card write enable connection, a card detect connection, a card reset connection, and a programming supply voltage connection.

46. The apparatus of claim 35, wherein said Smartcard device in said input/output configuration provides at least one of the following electrical connections: interrupt request connection, a connection indicating that the data passing through said input/output connections has 16 bits, a connection allowing register selection, a connection allowing enablement of said data input/output connections, a connection allowing receipt or issuance of an audio digital waveform, a connection indicating that the status of said card has changed, a connection allowing read enablement of said data input/output connections, and a connection allowing write enablement of said data input/output connections; and said Smartcard device in said input/output configuration provides at least one of the following electrical connections: a card enable connection, a card output enable connection, a card write enable connection, a card detect connection, a card reset connection, and a programming supply voltage connection.

\* \* \* \* \*